United States Patent [19]
Smith

[11] Patent Number: 5,892,159
[45] Date of Patent: Apr. 6, 1999

[54] MASS FLOW RATE METER

[76] Inventor: James Everett Smith, 90 Fairway Dr., Fortine, Mont. 59918

[21] Appl. No.: 953,459

[22] Filed: Oct. 17, 1997

[51] Int. Cl.⁶ .................................................. G01F 1/78
[52] U.S. Cl. ..................................................... 73/861.354
[58] Field of Search ........................ 73/861.354, 861.355, 73/861.356

[56] References Cited

U.S. PATENT DOCUMENTS

| | | | |
|---|---|---|---|
| 2,624,198 | 1/1953 | Pearson | 73/861.354 |
| 2,831,349 | 4/1958 | Altfillisch et al. | 73/861.354 |
| 2,834,209 | 5/1958 | Jones et al. | 73/861.354 |
| 2,865,201 | 12/1958 | Roth | 73/861.355 |
| 2,923,154 | 2/1960 | Powers et al. | 73/861.354 |
| 3,087,325 | 4/1963 | Roth | 73/861.356 |
| 3,132,512 | 5/1964 | Roth | 73/861.355 |
| 3,276,257 | 10/1966 | Roth | 73/861.356 |
| 4,491,025 | 1/1985 | Smith et al. | 73/861.38 |
| 5,129,264 | 7/1992 | Lorenc | 73/861.342 |
| 5,728,951 | 3/1998 | Van Cleve et al. | 73/861.354 |

FOREIGN PATENT DOCUMENTS

| | | |
|---|---|---|
| 3230445 | 8/1982 | Germany . |
| 424828A | 10/1989 | Germany . |

OTHER PUBLICATIONS

Katys, G.P., *Continuous Measurement of Unsteady Flow*, Pergamon Press Ltd., 1964 at pp. 54–60.

*Primary Examiner*—William Oen
*Assistant Examiner*—Jewel V. Thompson
*Attorney, Agent, or Firm*—Thomas S. Hahn

[57] ABSTRACT

A meter to measure the mass flow rate of gases passing through a flow tube, with the flow tube being incorporated as part of a flow tube assembly mounted for continuous rotation about a spin axis and simultaneous deflection about a measurement axis. Also incorporated as part of the flow tube assembly are counterbalance masses mounted so as to provide radial forces that oppose Coriolis/gyroscopic forces generated from the flow tube. The flow tube assembly is mounted for deflection about the measurement axis using low friction rotary seals. The deflections of the flow tube assembly about the measurement axis have a linear relation to the mass flow rate of gas passing through the flow tube.

23 Claims, 6 Drawing Sheets

MASS FLOW RATE METER

TECHNICAL FIELD

This invention relates to an apparatus and method for accurately measuring mass flow rates of gases over very wide dynamic ranges, irrespective of gas type, temperature or whether the measured gases are flowing under high or low pressure or at high or very low mass flow rates. More specifically, the apparatus includes a flow tube assembly mounted so it can both be continuously rotated about a first axis and can simultaneously deflect about a second axis through angles that are proportional to the mass flow rates of the gases passed through the flow tube.

BACKGROUND ART

The actual mass flow rates of flowing gases are very important process parameters in the commercial world. However, because it was not previously feasible to measure unknown gas mass flow rates over wide dynamic ranges, especially when the flow was at low mass flow rates, it was necessary to rely on measurements of volume flow rates which could be made in spite of certain deficiencies. Such deficiencies arise from the facts that the actual volumes of any quantity of gas is dependent on at least pressure and temperature.

An example of why mass as opposed to volume is the definitive parameter for measuring quantities of gas is the fact that chemical reactions take place on the basis of calculable amounts of mass, not volume, e.g., it is predeterminable masses of hydrogen and oxygen that can be combined to form a given quantity of water. Though chemical reactions can be implemented using metered volumes of gases, it is actually the masses of the gases that must be first determined and then converted to volumes of gas. So, if only metered volumes of gases are measurable instead of metered masses of gases, the measured volumes are essentially intermediate substitutes for the required mass quantities, and the measured volume quantities have to be converted to mass quantities or vice versa to ensure provision of necessary quantities of gas to carry out reactions. The conversions between volume and mass or vice versa are unavoidably prone to error due to unpredictable physical parameter fluctuations such as temperature and pressure. As another example, specific amounts of energy, such as releasable thermal energy, through burning are available from calculable masses of certain gases. Application of scientific principles establish that there are a given number of British Thermal Units (BTUs) per pound for each given type of natural gas. In spite of this well-known scientific fact as to the relationship of BTUs and the mass of natural gases, commercial sales of natural gases are made on the basis of volume measurements because it was only such measurements that were previously feasible except in certain limited situations such as when measurements of high mass flow rates of gases or liquefied gases were made.

The difficulty in measuring gas mass flow rates in substantial part arises because gases have extremely low masses. These low masses when moved in a straight line produce essentially minute momenta or when moved in a straight line in combination with angular rotation such as flowing the gases through a vibrating or rotating pipe produce very small, almost undetectable gyroscopic or Coriolis type forces. Any system for measuring gas mass flow rates that must utilize extremely high gas mass flow rates to compensate for the low masses of gases is by this requirement alone extremely limited in applicability. The practical realities are that any instrument used to measure gas mass flow rates over wide dynamic ranges must be both inherently sensitive to the minute forces produced by flowing gases, and also essentially insensitive to extraneous forces produced by phenomena other than the flow of gases to be measured. As an example, practical applications can require measuring gas mass flow rates that are on the order of one pound per day. This is on the order of 1000 times lower than typical mass flow rate measurements for liquids. All of which results in the fact that though there have been many attempts—motivated by scientific or commercial necessity—to design instruments to measure gas mass flow rates over wide dynamic ranges, these attempts have failed or the resulting designs have been substantially limited in practical utility.

An early reported attempt to design a meter asserted as being capable of measuring the flow of either liquids or gases is described by G. P. Katys in a book titled *Continuous Measurement of Unsteady Flow*, Pergamon Press Ltd., 1964 at pp. 54–60. This described meter, identified as being a gyroscopic flow meter, incorporates a flow tube mounted on an annular rotor that is continuously rotated. The use of the word gyroscopic to identify this meter as being of a specific type is consistent with the provided explanation for how the meter was believed to operate, which explanation was premised on generation of gyroscopic moments. An alternative description of the operation of the meter is also set out in this book in terms of generated Coriolis forces. Irrespective of the genesis of the mathematics used to describe the operation of the meter, it is disclosed there that a flow tube is connected to fixed tubing using couplings that permit continuous rotation of the flow tube with respect to the fixed tubing. This continuous rotation in combination with the passage of some mass flow rate for a fluid through the flow tube is asserted to generate forces that cause the flow tube to deflect about an axis different from the axis about which the continuous rotation occurs. Such Coriolis/gyroscopic force induced deflection of the flow tube occurs about an axis passing through bearings interconnecting the flow tube with the annular rotor, and additionally such deflection is also described as being facilitated by two flexible couplings incorporated as parts of the mounted flow tube. The flow tube is described as being a special, mechanical system including multiple interconnected linear segments at various orientations with respect to each other. Among these are six sections identified as being closed and arranged for the purpose of compensating centrifugal forces occurring in fluids passing through the flow tube. As described, the meter provides no mechanical or other mechanism for compensating radial acceleration forces arising solely from continuous rotation of the fluid filled flow tube as opposed to forces caused by fluid flow. It may have been thought that radial acceleration forces arising from rotation of the filled flow tube would be absorbed or in some fashion damped by the flexible couplings. Irrespective of intended functions for the flexible couplings, it has been understood and widely recognized, subsequent to these disclosures, that flexible couplings unavoidably respond to fluctuating fluid pressures so that the flexible couplings themselves become sources of significant forces which inherently limit, if not absolutely, preclude the making of accurate measurements of mass flow rates of even dense liquids passing therethrough, much less of those of gases with their minute momenta. Pressure induced forces produced from flexible couplings are unpredictable for every fluid pressure fluctuation causing flexure of such couplings, and, therefore, it is not possible to calibrate this meter to make repeatable or accurate measurements.

Another prior meter identified as being of the gyroscopic type is described in U.S. Pat. No. 2,831,349. According to the description for this meter, the entire sensing element, including a tube, brackets, the fluid material flowing through the tube and the measuring elements, must be balanced. Additionally, it is stated that the centrifugal components of the entire sensing element mass must be balanced about the plane of the gyroscopic spin axis and the drive axis. As described, one of the embodiments for a meter of this type has a sensing element, that includes multiple flow loop segments through which fluid is passed. These flow loop segments are all interconnected so that fluids flow through every flow loop segment. This sensing element composed of the interconnected flow loop segments is supported inside a gimbal by a pair of torque bars that mechanically interconnect the sensing element with the gimbal, and which in combination with a pair of bellows are supposed to permit deflection of the sensing element under the influence of a generated gyroscopic couple. The pair of bellows are integrally incorporated as part of the interconnected flow loop segments so fluids pass through them. Since the momenta for gas mass flow rates are truly minute in magnitude, the resulting forces from combining rotation and gas momenta would be substantively eclipsed, both by pressure induced forces arising from the bellows and the spring forces of the torque bars which resist deflection no matter how slight the spring forces. In fact, even if the spring forces arising from the torque bars were theoretically so slight as to permit measurable deflections in response to gas mass flow rates, the bellows would unavoidably and unpredictably introduce variable pressure induced forces that would exceed the magnitude of gas mass flow rate induced forces and thus prohibit prediction of any meaningful relationship between the mass flow rates of flowing gases and the resulting deflection angles.

The need for accurately measuring gas mass flow rates over wide dynamic ranges has long been recognized, but the technical difficulties that must be addressed to make such measurements have not been previously overcome.

SUMMARY OF THE INVENTION

The apparatus for this invention accurately measures gas mass flow rates over wide dynamic ranges, using a flow tube assembly that is mounted for continuous rotation. The flow tube assembly, in addition to being mounted for continuous rotation about a first axis, is also mounted for effectively friction-free deflection of the flow tube about a second axis that is at an angle to the first axis. The deflections of the flow tube about the second axis are in response to forces induced by combination of the continuous rotation of the flow tube and the gas mass flow rates passing through the flow tube. The vector parameters, i.e., magnitude and direction, for the forces causing deflections can be predicted using mechanical analyses premised on either gyroscopic moments or Coriolis induced effects. Therefore, these forces will be identified here as Coriolis/gyroscopic forces.

Extending from the flow tube assembly in opposing directions from the flow tube are counterbalancing masses such as counterbalance beams to which are attached fixed mass weights that, on rotation of the flow tube assembly about the first axis, produce a pair of radial acceleration forces acting about the second axis. The positions of the attached fixed masses on the counterbalance beams are selected so that the resulting pair of radial acceleration forces are greater in magnitude than the combination of radial acceleration forces produced by the (i) flow tube assembly filled with the mass of the gases in the flow tube, and (ii) the Coriolis/gyroscopic forces produced by the mass flow rates of the gases flowing through the rotating flow tube. By configuring the flow tube assembly to be balanced in this fashion, the mass flow rates of passed gases are effectively compared to the masses attached to the flow tube assembly in opposing directions to the flow tube, and the resulting deflections of the flow tube assembly about the second axis are proportional to the mass flow rates of gases passing through the flow tube. This proportionality is linear, in that for any given mass flow rate there is a deflection of the flow tube assembly about the second axis that is related to mass flow rate by a constant as is discussed below.

The sensitivity of the meter of this invention to measure passed gas mass flow rates is selectable by, for example, adjustment of the positions of the fixed mass weights along the counterbalance beams. The further the fixed mass weights are positioned from the second axis the smaller will be the deflections of the flow tube assembly about that second axis for a given gas mass flow rate passing through the flow tube. These adjustments of meter sensitivity do not affect the linearity of the measurements made with the meter.

Unlike the prior art, the meter of this invention incorporates rotary seals that do not produce extraneous forces in response to pressure changes in measured gases, and these rotary seals also provide substantially friction-free rotation. Furthermore, the pressure insensitivity and substantially friction-free operation of these rotary seals permits gases to pass into and out of the meter with little leakage. For a preferred embodiment of the meter, the gas leakage from the rotary seals was on the order of 1.0 percent. Two of the preferred embodiment rotary seals are used to mount the flow tube assembly so it can deflect about the second axis. A third rotary seal of the same type is used to pass gas into a flow path leading to the flow tube assembly and to permit high speed continuous rotation, e.g., about 900 revolutions per minute (RPM), of the flow tube assembly about the first axis. High speed rotation is important because as the angular velocity about the first axis increases so does the Coriolis/gyroscopic forces caused by the mass flow rates of the flowing gas. These Coriolis/gyroscopic forces, as generated by rotated gas flow, are inherently minute and, therefore, very high angular velocities are employed to provide a critical amplification factor. In fact the operating angular velocities for the meter of this invention are on the order of one hundred times higher than those used for operation of vibrating tube Coriolis mass flow rate meters that measure liquid mass flow rates.

As earlier explained, at least one prior meter that incorporated a continuously rotated flow tube utilized torsion springs to counteract generated Coriolis/gyroscopic forces. Because the mass flow rate induced Coriolis/gyroscopic forces for gases are so minute in magnitude, even when produced by very high angular velocities, this and other prior meters included flexible couplings, such as bellows, as part of the flow tube structure to facilitate the achievement of measurable deflections. However, including such couplings as part of flow tube structures unavoidably introduces unpredictable pressure induced forces that eclipse any gas flow induced Coriolis/gyroscopic forces. To address the requirement for adequate sensitivity, the present meter in contrast uses substantially friction-free rotary seals to mount the flow tube assembly for deflection about its second axis and utilizes radial acceleration forces produced by counterbalancing masses to oppose generated Coriolis/gyroscopic forces. Additionally, the rotary seals are used to pass gas into and out of the flow tubes. The substantially friction-free rotary seals ensure that the mass flow rate induced Coriolis/ gyroscopic forces are effectively only counteracted by the radial acceleration forces produced by counterbalancing masses. This arrangement permits sensitive, linear and accurate measurements to be made from readily determinable angular deflections caused by flow rates of flowing gas with a meter that has an inherent long term stability. In fact, measurement accuracies of ±0.5 percent have been achieved with a meter of this invention irrespective of gas density variations that ranged from atmospheric pressure helium to high pressure nitrogen.

Actual angular deflections of the flow tube assembly for this invention caused by mass flow rates of rotated flowing gas can be measured using many different implementations, including optical, magnetic or capacitance. The presently preferred implementation is optical, but others are as effective so long as an accurate measurement of angular position is made, and no forces are introduced that would mask the minute gas mass flow rate-induced Coriolis/gyroscopic forces. Measured angles can be digitized using an oscillator and a scalable counter to provide a direct reading of the passed gas mass flow rates.

The flow tube assembly and its mountings for this invention can be supported in a pressure vessel, so the pressure rating for the meter is determined by the pressure vessel rating. This arrangement, essentially independent of applied gas pressure, permits use of thin, light weight flow tubes.

BRIEF DESCRIPTION OF THE DRAWINGS

Corresponding components in the various figures are either designated by the same reference numerals or, if different reference numerals are used, their relationship is identified in the text. The various objectives, advantages and novel features of the invention will become more readily comprehended from the detailed description when taken in conjunction with the appended drawings, in which.

DESCRIPTION OF PREFERRED EMBODIMENTS

Figure 1:
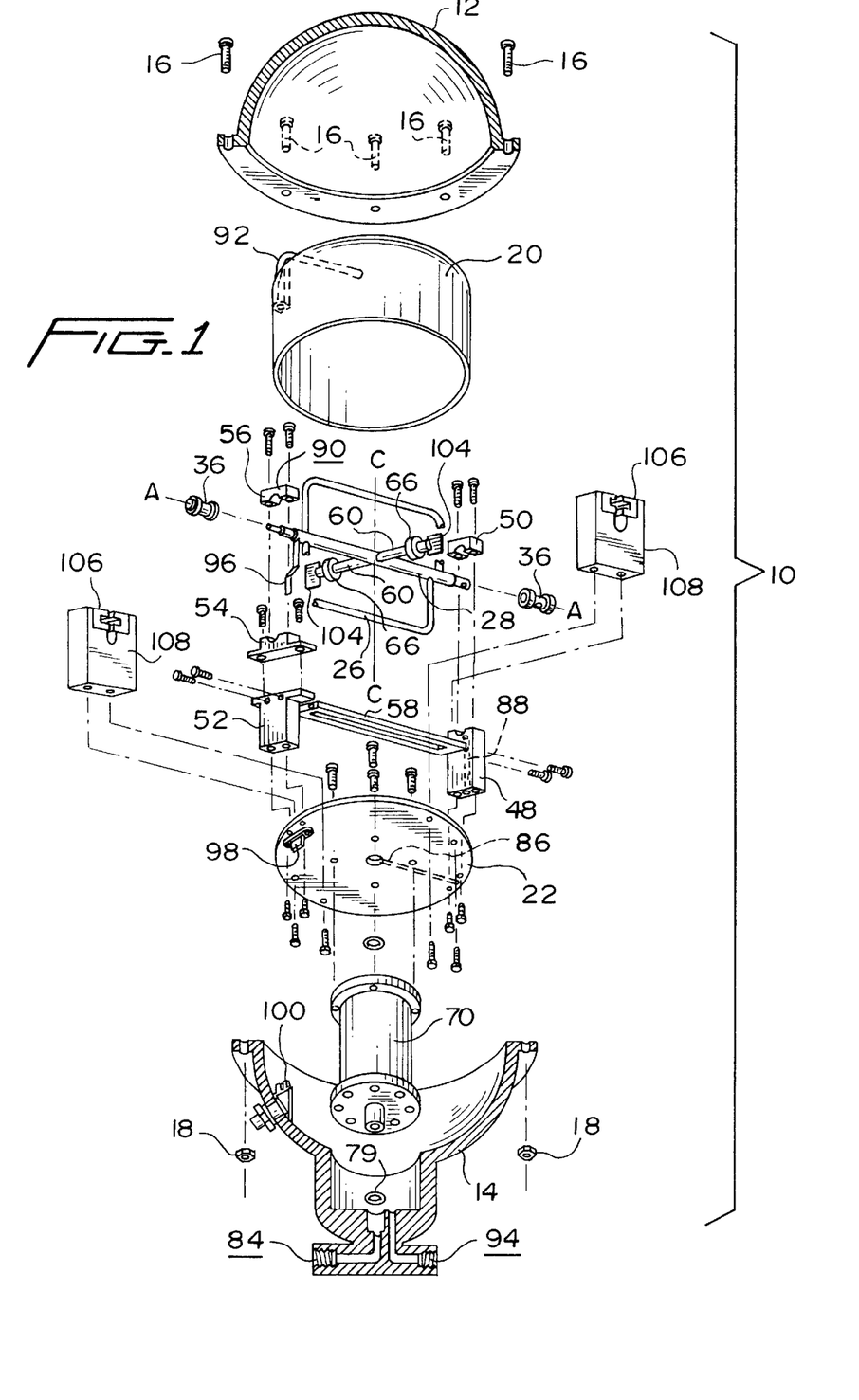
FIG. 1 is an exploded view of the meter of this invention with a spherical pressure vessel shown in sectional view.

Referring now to the drawings, an exploded view showing the major components and their relationships for a meter according to the invention is set out in FIG. 1. The meter according to the invention shown in FIG. 1 is generally designated by reference numeral 10. Components for the meter 10 shown in FIG. 1 can be enclosed in a pressure vessel formed by bolting an upper pressure vessel half 12 to a lower pressure vessel half 14 using bolts 16 and nuts 18. The two halves of the pressure vessel can be joined using fasteners other than bolts 16 and nuts 18 as long as the necessary pressure rating for the assembled pressure vessel is achieved. Further, depending on the environment where the meter 10 is to be used and the pressures of gases to be measured, it may not be necessary to use a pressure vessel.

Within the pressure vessel there is a second enclosure formed from a rotating cylinder 20 and a base plate 22. The rotating cylinder 20 can be joined to the base plate 22 using a press fit, known fasteners or structures such as mating threads between the rotating cylinder 20 and base plate 22.

Figures 2, 3, 9, 10:
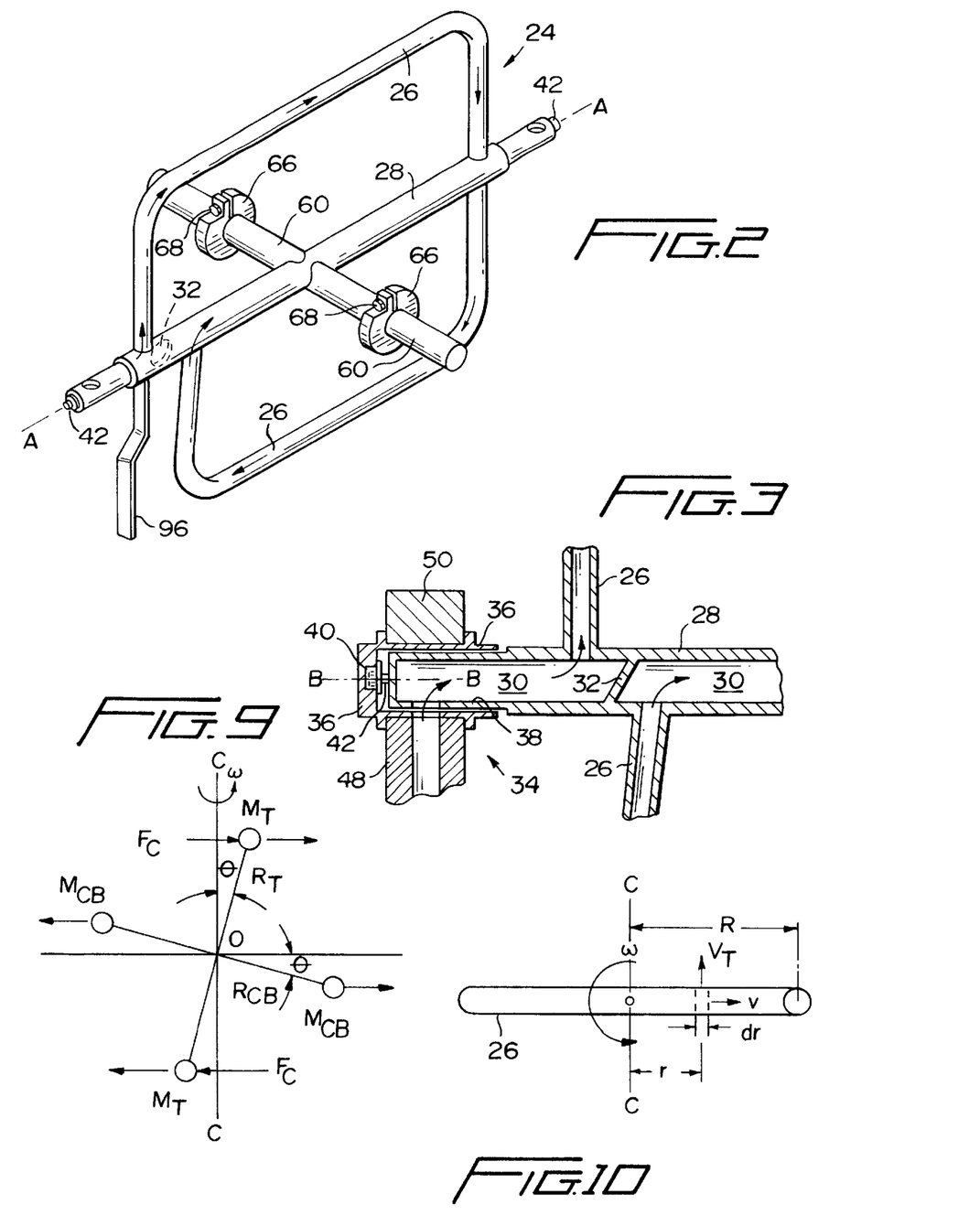
FIG. 2 is a perspective view of a double tube flow tube assembly embodiment for this invention.
FIG. 3 is a sectional view of a rotary seal embodiment for this invention.
FIG. 9 is a schematic free body diagram for a generic flow tube assembly of the invention with counterbalancing masses.
FIG. 10 shows a schematic view of a flow tube rotating about a central axis.

Supported in the joined rotating cylinder 20 and base plate 22 is a flow tube assembly, a partial perspective view of which is also shown in FIG. 2. The flow tube assembly is generally designated by reference numeral 24. Other embodiments for the flow tube assembly 24 are described below. Irrespective of the embodiment, the flow tube assembly 24 includes a flow tube 26 connected to a central beam 28 or other structure for supplying and exhausting gases to and from the flow tube 26. Included within the longitudinal passage 30 through the central beam 28 is at least one baffle 32 (also see FIG. 3) to direct gas flow through the flow tube 26. Alternative embodiments for the flow tube assembly 24 such as those shown in FIGS. 2, 4, 5 and 6 can have a single flow tube 26 (see FIG. 4), multiple flow tubes 26 (see FIGS. 2 and 5) or a single flow tube 26 with multiple loops (see FIG. 6). There is no unique configuration for or number of flow tubes 26 for the flow tube assembly 24 of this invention. The configuration requirements for the flow tubes 26 to provide an effective flow tube assembly 24 are described below.

Substantially friction-free rotary seals, generally designated by reference numeral 34 (see FIGS. 3 and 7), are used to both mount the flow tube assembly 24 within the rotating cylinder 20 and base plate 22, and to supply and exhaust gases to and from the flow tube assembly 24. A cross-sectional view of a preferred embodiment for the rotary seal 34 is shown in FIG. 3. The rotary seal 34 is used to mount both sides of the flow tube assembly 24 with one rotary seal 34 used to supply gases and the other identical rotary seal 34 used for mounting the other side of the flow tube assembly 24 and for exhausting gases. Three components are used to assemble the rotary seal 34; an outside barrel housing or stator 36; a cylinder insert or rotor 38; and a ball bearing 40 interconnecting the stator 36 to the rotor 38. A critical requirement for the rotary seals 34 as shown in FIG. 3 is a close tolerance fit between the outside diameter of the rotor 38 and the inside diameter of the stator 36. For 0.300 inch outside diameter rotors 38, a clearance of only about 0.001 inch between the inside diameter of barrel housings 36 has been found to both successfully permit substantially friction-free rotation and extremely low gas leakage, e.g., gas leakage on the order of 1.0 percent of the total flow. In operation, the 1.0 percent of total flow that might escape through the rotary seals is not vented to the atmosphere since it is contained by the pressure vessel. Although this leakage gas does not pass through the measurement tube, it can be accounted for in the readout electronics. Specifically, such seal leakage is proportional to the differential pressure across the rotary seal 34 boundary which in turn is related to the differential pressure across the flow tube 26. Over a wide range of meter operation, the pressure drop across the flow tube 26 is a linear function of mass flow rate and therefore even a ±10 percent electronic compensation for the one percent leakage gas reduces this potential error to ±0.1 percent which is easily acceptable for a mass flow rate gas meter.

The stators 36 and rotors 38 for rotary seals 34 can be machined from 316 stainless steel or any other material that can be made into accurately dimensioned parts including metals, plastics, glasses or ceramics. A criteria in selecting this material, as with all materials used for the meter, is that it not be susceptible to corrosion when exposed to the gases being measured. Finally, the ball bearings 40 interconnecting the stators 36 and rotors 38 are mounted on cylinder studs 42 extending from the center of the rotors 38 and are press fit into mating cups provided in the center of cap ends on each stator 36. This arrangement permits the rotors 38 to be rotated with respect to the stators 36 about axes of rotation B—B, as shown in FIG. 3, in a substantially friction-free manner because there is no contact between the stator 36 or rotor 38 during rotation. The ball bearings 40 can be made of stainless steel with a 5/32 inch outside diameter and a 3/64 inch inside diameter as supplied by New Hampshire Ball Bearings, Inc., of Peterborough, N.H., for rotary seals 34 made of the materials and to the dimensions described here. Again, for rotary seals 34, as described here, the central beam 28 and the flow tube 26 of a flow tube assembly 24 can be made of 316stainless steel with a 0.25 inch outside diameter. However, other materials or combinations of materials can be used as long as the materials are compatible, e.g., can be joined for making multiple part assemblies and can be made into accurately dimensioned parts. Acceptable materials can include metals, plastics, glasses or ceramics with a critical criterion in material selection being that they not be susceptible to corrosion when exposed to the gases being measured.

Figure 7:
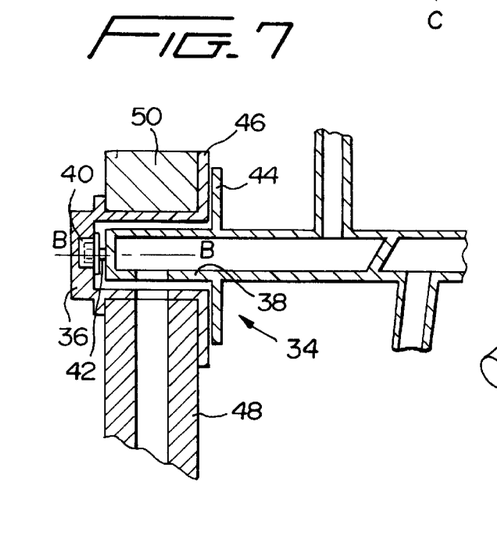
FIG. 7 is a sectional view of a rotary seal alternative embodiment to that shown in FIG. 4 for this invention.

An alternative embodiment for a rotary seal 34 of the invention is shown in a cross-sectional view in FIG. 7. This rotary seal 34, as shown in FIG. 7, can also be used to mount both sides of the flow tube assembly 24, and simultaneously supply and exhaust gases from the flow tube 26. Again three components are used to assemble the rotary seal 34; an outside barrel housing or stator 36; a cylinder insert or rotor 38; and a ball bearing 40 interconnecting the stator 36 to the rotor 38. Unlike the rotary seal 34 shown in FIG. 3, there is not a close tolerance fit between the outside diameter of the rotor 38 and the inside diameter of the stator 36. Instead there is a close tolerance spacing maintained between the rotor flange 44 and the stator flange 46. This spacing is maintained at 0.001 inch between the rotor flange 44 and the stator flange 46 by the ball bearing 40 interconnecting the stator 36 to the rotor 38. It is this spacing and the extent of the surface areas between the rotor flange 44 and stator flange 46 for this embodiment of the rotary seal 34 that provides both extremely low gas leakage, e.g., gas leakage that can be on the order of 1.0 percent of the total flow, and substantially friction-free rotation. As with the flow tube 26, the materials to be used in making the rotary seal 34 shown in FIG. 7 must not be susceptible to corrosion when exposed to gases being measured.

The flow tube assembly 24, using the rotary seals 34, is mounted to the base plate 22 on one side with a gas inlet post 48 and a top yoke piece 50, and on the other side of the flow tube assembly 24 with an outlet post 52, a bottom yoke piece 54 and a top yoke piece 56. These are all screwed together and to the base plate 22 so that the rotary seals 34 are mounted in yokes and the flow tube assembly 24 can rotate in a substantially friction-free manner about an axis A—A defined by the longitudinal length of the central beam 28. This axis A—A, which is coincident with the axes of rotation B—B for the two rotary seals 34 (see FIG. 3 or 7), is identifiable as a measurement axis. A stop plate 58 can be screwed to the inlet post 48 and the exhaust post 52 with a counterbalance beam 60 (see flow tube assembly embodiment shown in FIG. 4) or a flow tube 26 positioned between rails of the stop plate 58 for the embodiment of the flow tube assembly 24 as shown in FIG. 1. As the flow tube assembly 24 rotates about the measurement axis A—A, the counterbalance beam 60 or the flow tube 26 positioned between the rails of the stop plate 58 will be prevented from making rotations beyond fixed angular limits. It is between these angular limits that corresponding quantities of gas mass flow rates will be measured.

Figure 4:
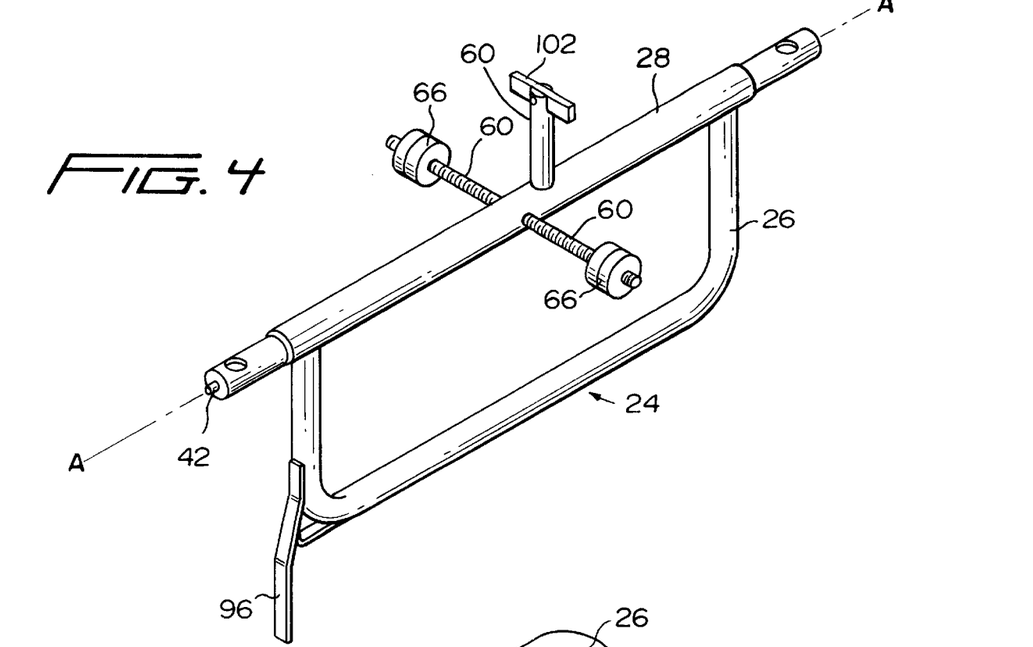
FIG. 4 is a perspective view of a single tube flow tube assembly embodiment for this invention.

Two counterbalance beams 60 are shown in the perspective view of the flow tube assembly 24 embodiment shown in FIGS. 1 and 2. These counterbalance beams 60 as shown in FIGS. 1 and 2 are hollow. However, such counterbalance beams 60 do not have to be hollow. Effective solid counterbalance beams 60 for flow tube assemblies 24 are shown, by way of example, in FIGS. 4 and 5. In the case of the embodiment for the flow tube assembly 24, as shown in FIG. 4, one counterbalance beam 60 extends in an opposite direction from that of the flow tube 26 and provides mechanical balance about the central beam 28 with respect to the flow tube 26, and two other counterbalance beams 60 are attached and extend in opposite directions with respect to each other from the central beam 28.

For the flow tube assembly 24, shown in FIGS. 1 and 2, the counterbalance beams 60 are attached and extend in opposite directions from the central beam 28 and are also arranged so as to be at mutually perpendicular locations with respect to the flow tubes 26. Tests have shown that it is not necessary to use hollow counterbalance beams 60 (as shown in FIGS. 1 and 2) in order to be able to make accurate gas mass flow rate measurements. However, it is critical to have effective counterbalancing masses to provide radial forces that are compared against generated Coriolis/gyroscopic forces.

Figure 5:
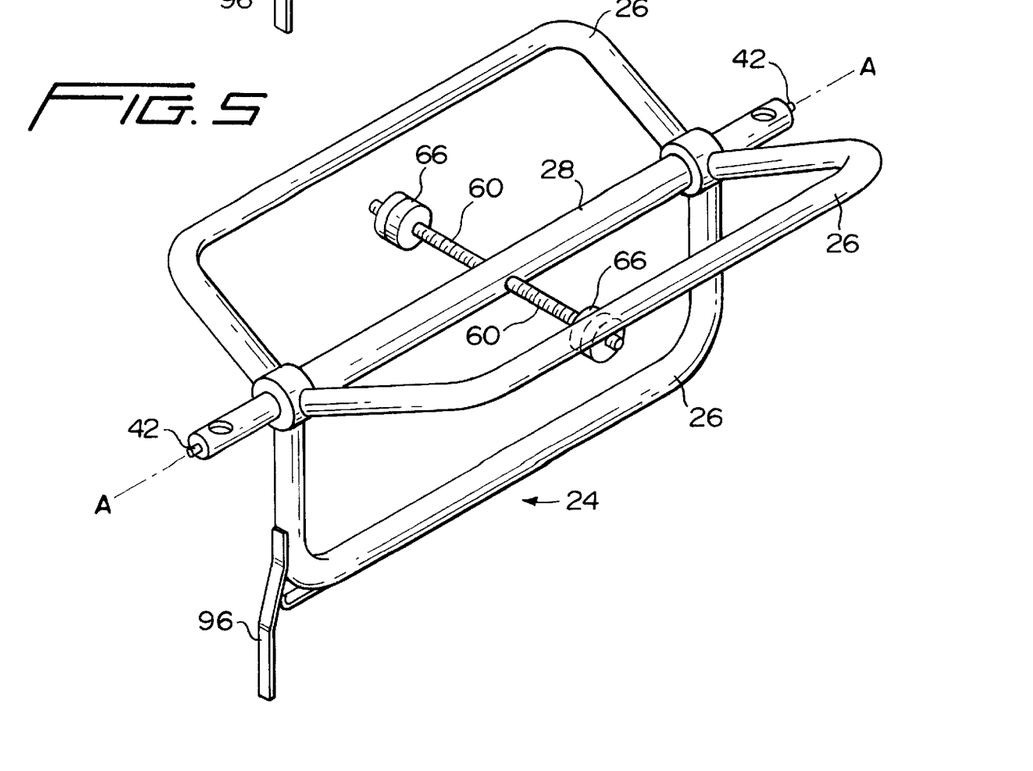
FIG. 5 is a perspective view of a triple tube flow tube assembly embodiment for this invention.

Weights 66, that can be of substantially equal masses, are individually mounted on each counterbalance beam 60. These weights 66 can be constructed so that bolts 68 can be used to fix the location of the weights 66 at any position along the length of the counterbalance beams 60. Alternatively the counterbalance beams 60 can have external threads and the weights 66 can be threaded onto any location along the length of the counterbalance beams 60 as shown in FIGS. 4 and 5. The purposes for and functioning of the counterbalance beams 60 and weights 66 will be described in detail below.

Figure 8:
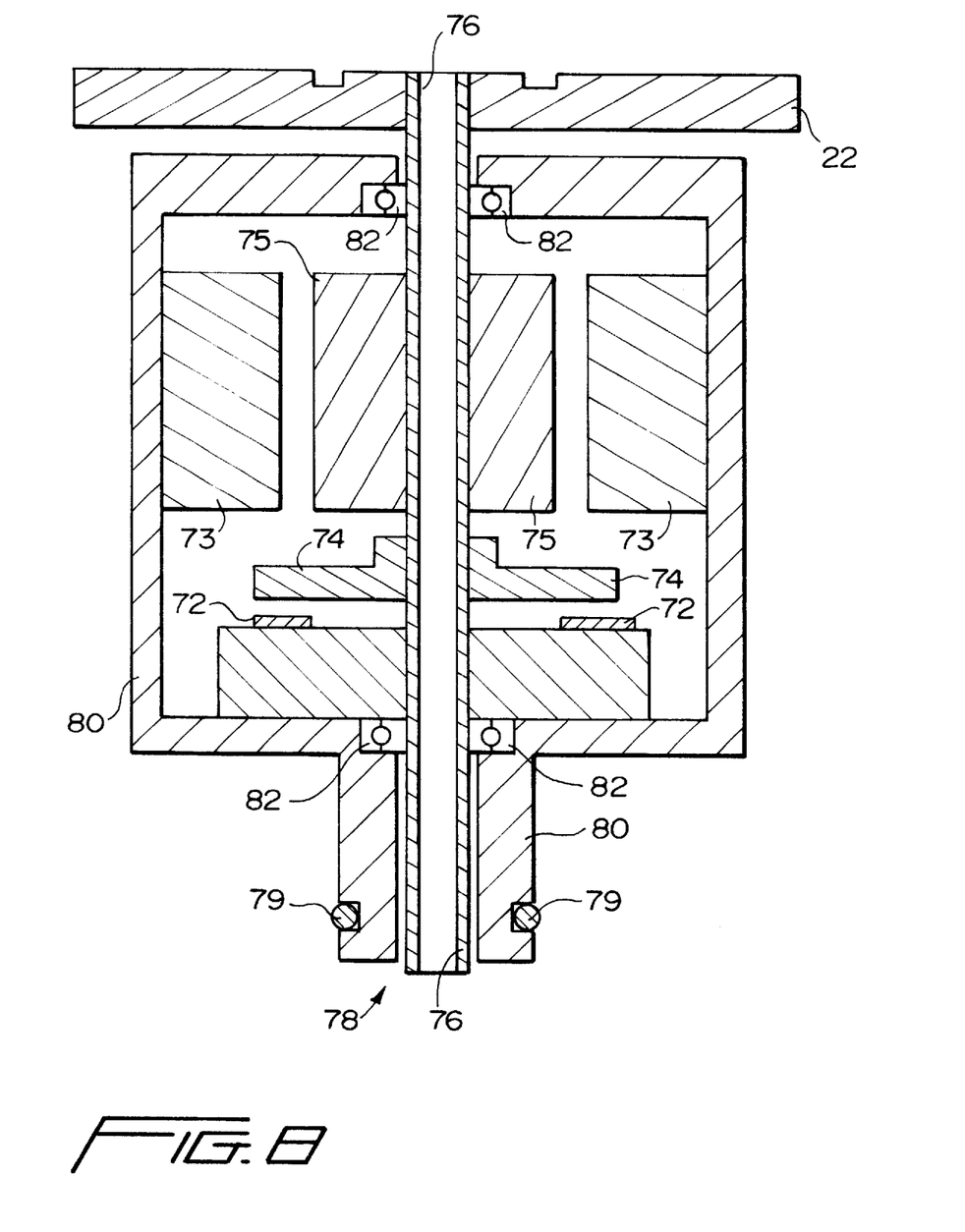
FIG. 8 is a sectional view of a DC brushless motor used to rotate the flow tube assembly shown in FIG. 1.

The assembled rotating cylinder 20, base plate 22 and flow tube assembly 24, as shown in FIG. 1, are mounted on an electric motor 70 so that they are both continuously rotated about a cylinder spin axis C—C, and gases, whose mass flow rates are to be measured are passed to flow through the flow tube 26. The motor 70 needs to have sufficient capacity to continuously rotate the assembled structure supporting the flow tube assembly 24 at angular speeds approximating at least 15 revolutions per second (RPS). For a preferred embodiment of a motor 70, according to the invention, a 1/25 horsepower brushless direct current (DC) motor manufactured by Hurst Manufacturing Division of Princeton, Ind., was found to be adequate. A critical requirement for the motor is that it provide a constant angular speed to the output shaft. For the identified preferred DC brushless motor a known electrical power drive circuit incorporating a phase lock loop with a crystal oscillator (not shown) is used for assuring a constant rotation output rate. Outputs from Hall effect transistors 72, triggered by a magnetic coded disc 74 attached to the shaft 76 of motor 70 (see FIG. 8) are processed with the output of the crystal oscillator to provide the phase lock loop. Motor stator windings 73 are then energized using this phase lock loop system to rotate motor shaft 76 at a constant rate by interaction with the magnetic field produced from rotor magnets 75.

Again, to provide for both low friction rotation and low gas leakage flow, a rotary seal 78 is used to interface the motor 70 to the lower pressure vessel half 14. Here, the tubular motor shaft 76 is supported for rotation within a motor housing 80 using precision ball bearings 82 that are supplied by New Hampshire Ball Bearings, Inc., of Peterborough, N.H. At the gas inlet end to the motor 70, there is again a close, e.g., 0.001 inch diameter clearance, between the outside diameter of the motor shaft 76 and the motor housing 80 to minimize gas leakage. An O-ring 79 is used to provide a gas tight seal between the outside surface of the motor housing 80 and the lower pressure vessel half 14.

Gases flow from an inlet port 84 in the lower pressure vessel half 14 through the center of the motor shaft 76 into a gas passage 86 in the base plate 22. From the gas passage 86 in the base plate 22, the gases flow through a gas passage 88 in the inlet post 48 to the rotary seal 34 for inletting to the flow tube assembly 24. After flowing through the flow tube assembly 24, the gases pass through another rotary seal 34 for exhausting gases and using a gas passage 90 in the top yoke piece 56 through a rotating cylinder exhaust tube 92 that vents the gases out of the rotating cylinder 20 and into the interior of the pressure vessel. As configured, the rotating cylinder exhaust tube 92 has its terminus at or close to the spin axis C—C adjacent the outside of the rotating cylinder 20. This arrangement assures that exhausted gases are not subjected to substantial accelerations caused by the continuous rotation of rotating cylinder 20 that would affect gas flow rates passing through the flow tube 26. After filling the pressure vessel, the gases are vented from outlet port 94 in the lower pressure vessel half 14.

In operation, gases whose mass flow rates are to be measured are fed into the meter 10 of the invention, as shown in FIG. 1, through inlet 84, and these gases are then supplied to the flow tube 26 to produce Coriolis/gyroscopic forces that are compared to the radial forces produced by the combination of counterbalance beams 60 and weights 66 to cause deflection of the flow tube assembly 24 about the measurement axis A—A. The magnitudes of such angular deflections are linearly proportional to mass flow rates of flowing gases, as is explained below.

The magnitudes of generated Coriolis/gyroscopic forces to be measured are in the extreme sub-milligram range, and hence, any disturbances of the angular position of the flow tube assembly due to wind currents have to be eliminated. Therefore, the rotating cylinder 20 enclosing the flow tube assembly 24 has as a primary function the shielding of the mounted flow tube assembly 24 from relative winds. As a secondary function, the rotating cylinder 20 shields the mounted flow tube assembly 24 from being externally impacted by most contaminants, such as solid particles, that may be passed with gases through the flow tubes 26.

Another arrangement to facilitate measurement of the sub-milligram generated Coriolis/gyroscopic forces usable with the meter 10 of the present invention is magnetic damping. Such damping arrangements are velocity sensitive but not position sensitive, and, therefore, provide an extraneous vibration filter system. For the embodiment of the meter 10 shown in FIG. 1, electrically conductive plates 104, such as copper, are attached to the ends of counterbalance beams 60 and magnets 106 are supported from base plate 22 by magnet posts 108 so that the conductive plates 104 can move through the magnetic fields of magnets 106. Movement of the conductive plates 104 in the magnetic fields generate eddy currents that oppose the movement and therefore act as a damper. This arrangement to use magnetic damping will not dampen the effects caused by generated Coriolis/gyroscopic forces but will filter out extraneous forces such as those arising from external vibrations.

Physical measurements of angular deflections of the mounted flow tube assembly 24 are made using a pick-off flag 96 attached to the central beam 28. The end of the pick-off flag 96 opposite the central tube 28 protrudes through a slot in the base plate 22 into a pick-off window 98 that consists of two optically transparent plates, such as sheets of plastic, that allow light to be passed about the pick-off flag 96 so its position can be determined. When assembled, an optical slot detector 100 mounted on the lower pressure vessel half 14 is positioned so that when the base plate 22 is rotated about the spin axis C—C a light source that can be a light emitting diode (LED) and a detector that can be a solid state switch, both of which are well known and not shown in the Figures, are supported from the optical slot detector 100 to have the pick-off window 98 with the pick-off flag 96 passed between the light source and the detector. The optical slot detector 100 with light source and detector can be an integral MOC75 series device as sold by Motorola of Phoenix, Ariz.

As the pick-off window 98 is rotated past the pick-off slot detector 100, there is an opaque portion of the window 80 at the leading edge where window 98 begins its passage through the pick-off slot detector 100. Similarly, there is an opaque portion of the window 98 at the trailing edge adjacent where the window 98 exits from the pick-off slot detector 100. When the window 98 passes through the slot detector 100 on each revolution, three pulses are generated from the detector: one by the fixed, opaque leading edge of the window 98; followed by one due to the pick-off flag 96 at its variable position; and a third due to the fixed position of the opaque trailing edge of the window 98. It is the relative temporal relationships of these three signals that are used to determine the angular position of the flow tube assembly 24.

In operation, a known high frequency oscillator is gated by the signals from the optical detector and the variations in the oscillator signal pulses are counted from the leading edge pulse until that corresponding to the pick-off flag 96 position. This count number is stored in a known tare counter by depressing a zero reset button at a time of known zero gas flow rate to establish a reference measurement for the perennial position of the pick-off flag 96. In a gas flow situation, the number stored in the tare counter is transferred to a known down counter that is activated by a subsequent window 98 translation through the slot detector 100.

For a positive gas flow situation, the pick-off flag 96 moves away from the perennial position toward the leading edge of the window 98 and hence, insufficient pulses will be generated to totally down count the tare storage. Hence, positive gas flow is measured after the window 98 passage as signaled by the pulse corresponding to the trailing edge, by down counting the remaining number in the down counter.

In a negative gas flow situation, the leading edge to pick-off flag 96 count is more than enough to down count the tare number representative of the perennial position; and as such, negative gas flow is determined by counting the remaining oscillator cycles after the tare counter reaches zero.

It should be noted that digital filtering of the flow signal can be accomplished by using multiple revolutions of the meter to generate a given flow signal. In other words, if for example, the zero flow tare number, i.e., the measurement of the perennial angular position for the pick-off flag 96, is generated by counting the oscillator cycles from the leading edge pulse to the pick-off flag 96 pulse, and accumulating this count for ten revolutions—by repeating this process for a gas flow situation, the number of difference counts will be increased by ten fold, and this number may be divided by ten to effect an average gas mass flow rate for the time period of ten revolutions of the meter.

Using this method, i.e., a count and display of the differential pulses, (excess or deficit) per measurement cycle, provides measurements of passed gas mass flow rate.

Total gas mass flow is easily obtained by simply accumulating the differential pulses generated by each measurement cycle, without resetting after each cycle.

Though the preferred embodiment for measuring the angular displacement of the flow tube assembly 24 is described here as being optically based, other embodiments are effective as long as accurate measurement of angular position is made, and no forces are introduced that would mask the minute gas mass flow rate induced Coriolis/gyroscopic forces.

As can now be understood, a critical structure of the meter 10 is the flow tube assembly 24. This flow tube assembly 24 must be balanced about measurement axis A—A so as to operate with essentially zero acceleration loading on rotary seals 34. The required balance is also necessary to eliminate vibration induced torques that may obscure the measurement of the minute generated Coriolis/gyroscopic torques.

Counterbalance beams 60 are incorporated as parts of the flow tube assembly 24 to provide required balance in combination with weights 66 for the flow tube assembly 24 embodiments shown in FIGS. 1, 2, 4 and 5. These counterbalance beams 60 are rigidly mounted, by, for example, welding them to the central beam 28.

The flow tube assembly 24 embodiment shown in FIG. 4 has one counterbalance beam 60 with its attached weight 102 mounted opposite the flow tube 26. This counterbalance beam 60 with its attached weight 102 are configured so that the center of gravity for the combination of the flow tube 26 and the opposing counterbalance beam 60 with weight 102 is at the center of the central tube 28 where the measurement axis A—A and the spin axis C—C intersect. Additionally, for this embodiment of the flow tube assembly 24 the counterbalance beam 60 opposing the flow tube 26 is so positioned that its longitudinal axis is coincident with the spin axis C—C. This longitudinal axis for the counterbalance beam 60 is an axis of symmetry so that rotation about the spin axis C—C is balanced.

In the cases of the flow tube assembly 24 embodiments shown in FIGS. 1, 2, 4 and 5, there are two counterbalance beams 60 attached to the central beam 28 that are perpendicular to both the spin axes C—C and the measurement axes A—A and have the centers of gravity for the combinations of these attached counterbalance beams 60 with weights 66 located at the centers of the central beams 28 where the measurement axes A—A and spin axes C—C intersect. In addition to being useful for adjusting the required locations for centers of gravity for the attached counterbalance beams 60, the weights 66 also provide an easily used arrangement for adjustment of meter sensitivity, i.e., the magnitude of flow tube assembly 24 angular deflection for a given magnitude of passed gas mass flow rate. Because the closer these ring weights 66 are positioned to the measurement axis A—A, the lower is the torque applied to the flow tube assembly 24 about the measurement axis A—A by the rotation of the combination of the counterbalance beams 60 and weights 66, and, therefore, the greater the sensitivity of the meter 10. However, when the torque applied to the flow tube assembly 24 about the measurement axis A—A by the combination of the counterbalance beams 60 and weights 66 equals that of the flow tube 26, the flow tube assembly 24 becomes unstable about the measurement axis A—A as is discussed below. Accordingly, the torque applied by the combination of the counterbalance beams 60 and weights 66 must be greater than the sum of the generated Coriolis/gyroscopic forces and the radial acceleration forces of a slightly deflected flow tube 26.

Figure 6:
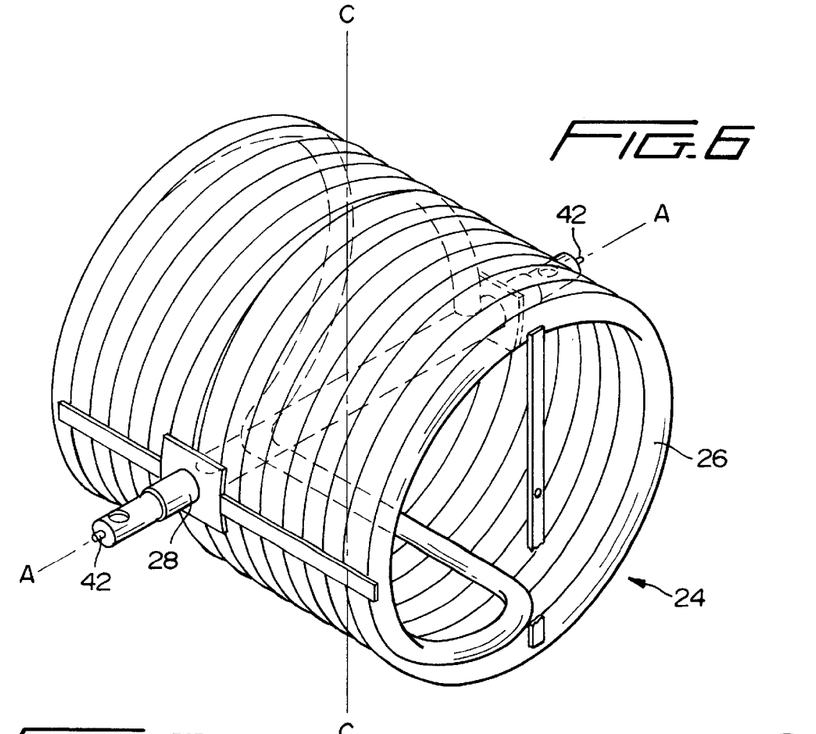
FIG. 6 is a perspective view of a multi-loop tube flow tube assembly embodiment for this invention.

The flow tube assembly 24 shown in FIG. 6 does not incorporate counterbalance beams 60. Instead this flow tube assembly 24 utilizes a multi-looped flow tube 26 which provides a serial flow path for injected gases. To provide the radial forces that would have been generated by counterbeam and weight combination arrangements, the loops of flow tube 26 extend away from the central beam 28 of the flow tube assembly 24 so as to both result in (i) a center of gravity for the flow tube assembly 24 that is substantially coincident with the intersection of the measurement axis A—A and spin axis C—C of the mounted flow tube assembly 24, and (ii) torques being applied to the flow tube assembly 24 about the measurement axis A—A by the loops of flow tube 26 displaced from the central beam 28 that are greater than those applied by the loop of flow tube 26 in the plane of central beam 28.

Operation of the mounted flow tube assembly 24 of the invention (irrespective of its physical embodiment) can be further understood by making reference to FIG. 9 which shows a simplified "free body" diagram of a flow tube assembly 24 for this invention. As is understandable from the following discussion, this "free body" diagram is substantively equivalent for purposes of the flow tube assemblies 24 shown in any of FIGS. 1, 2, 4, 5 and 6 or any equivalent flow tube assembly arrangement. The "free body" diagram set out in FIG. 9 depicts an end view of the flow tube assembly 24, with the measurement axis A—A extending out of the paper and the deflection angle θ shown as being measured from the spin axis C—C, and the resulting forces acting upon the mass of the flow tubes 26 and the counterbalance beams 60 with the weights 66 or their equivalents. As shown in this "free body" diagram: $M_T$ is the mass of each flow tube 26; $M_{CB}$ is the mass of each counterbalance beam 60 with weight 66; $R_T$ is the radius of gyration of the flow tubes 26; $R_{CB}$ is the radius of gyration of the counterbalance beams 60; $F_C$ is the Coriolis/gyroscopic force due to passed gas mass flow rates through the tubes 26; and θ is the flow tube assembly 24 deflection angle from the perennial position where the flow tube assembly 24 is located when there is no gas flow through the flow tube 26. In the case of the flow tube assembly 24 embodiment shown in FIG. 4, the counterbalance beam 60 and weight 102 attached opposite the flow tube 26 would also have a mass of $M_T$ and a radius of gyration of $R_T$.

The summation of the moments about the measurement axis A—A is given by:

$$\Sigma M_0 = 0 = 2F_C R_T \cos\theta + 2M_T\omega^2 R_T \sin\theta R_T \cos\theta - 2M_{CB}\omega^2 R_{CB} \cos\theta R_{CB} \sin\theta \quad \text{(Eq. 1)}$$

or, $$F_C R_T \cos\theta = M_{CB}\omega^2 R_{CB}^2 \cos\theta\sin\theta - M_T\omega^2 R_T^2 \sin\theta\cos\theta$$

For small deflection angles, $\cos\theta \approx 1.0$ and $\sin\theta = \theta$

Thus:

$$F_C R_T = \omega^2(M_{CB}R_{CB}^2 - M_T R_T^2)\theta \quad \text{(Eq. 2)}$$

$$\text{or, } F_C = \frac{\omega^2(I_{CB} - I_T)}{R_T}\theta \quad \text{(Eq. 3)}$$

The Coriolis/gyroscopic force $F_C$ according to Equation 3 is proportional to the deflection angle $\theta$ with the proportionality constant being:

$$\frac{\omega^2(I_{CB} - I_T)}{R_T} \quad \text{(Eq. 4)}$$

Thus, if the inertia of the counterbalance beams 60 with weights 66 and the flow tubes 26 are constants, and if the angular velocity $\omega$ is held constant, a given Coriolis/gyroscopic force will create a given linearly proportional deflection angle $\theta$ of the flow tube assembly 24.

The sensitivity of the meter 10 of this invention is, therefore, a function of the difference in inertia of (i) the combination of the counterbalance beams 60 and weights 66, and (ii) the flow tubes 26 (see FIGS. 1, 2 and 5). Alternatively, the sensitivity is a function of inertia differences between (i) the combination of the flow tube 26 and an opposing counterbalance beam 60 with weight 102, and (ii) the combination of the counterbalance beams 60 and weights 66 (see FIG. 4); or (i) a central loop of a flow tube 26, and (ii) loops of flow tube 26 displaced from the central loop (see FIG. 7). If these inertia terms are equal, the meter 10 is infinitely sensitive, and therefore, unstable. Beyond the mathematical curiosity of the unstable situation, there is the physical reality that for the meter 10 to practically function the inertia, and hence, the centripetal forces, produced by the rotated counterbalance beams 60 with weights 66 (or their equivalent) must be greater in magnitude than the combination of the inertia for the flow tubes 26 with contained gas and the Coriolis/gyroscopic forces produced by gas mass flow through the flow tubes 26. Stated mathematically, the term $(I_{CB} - I_T)$ must be greater than zero, i.e., $(I_{CB} - I_T) > 0$.

It is known that Coriolis forces act on a flow tube that is rotated at a given angular velocity with fluid, such as gas or liquid, moving through it, and that the Coriolis forces are proportional to the mass flow rate of the flowing fluid. Derivation of equations governing the relationships is repeated here for reference.

FIG. 10 shows a simplified flow tube 26 rotating about a central axis C—C, with an angular velocity $\omega$. In the flow tube 26, an increment of mass dm moves outward at a velocity V from the central axis C—C of rotation. The instantaneous tangential velocity $V_T$ of the incremental mass is given by:

$$V_T = \omega r \quad \text{(Eq. 10)}$$

and hence, the tangential acceleration is:

$$A_T = \frac{dV_T}{dt} = \omega\frac{dr}{dt} = \omega V \quad \text{(Eq. 11)}$$

The incremental mass dm exerts a tangential force $\Delta F_C$ on the flow tube 26, such that:

$$\Delta F_C = \Delta M A_T = \Delta M \omega V \quad \text{(Eq. 12)}$$

and, $$F_C = M\omega V \quad \text{(Eq. 13)}$$

For any type of fluid, gas or liquid in the flow tube 26, an incremental mass can be expressed by:

$$dm = \rho A dr \quad \text{(Eq. 14)}$$

or, $$M = \rho A R \quad \text{(Eq. 15)}$$

Where:
$\rho$ = the mass density of the fluid;
A = the cross-sectional area of the flow tube 26; and
dr = an increment of flow tube 26 length The mass flow rate Q, in the flow tube 26, is given by:

$$Q = \frac{dm}{dt} = \rho A \frac{dr}{dt} = \rho A V \quad \text{(Eq. 16)}$$

Combining Equations 15 and 16, $$Q = \frac{MV}{R} \quad \text{(Eq. 17)}$$

Now, from Equations 13 and 17, $$F_C = QR\omega \text{ or, } Q = \frac{F_C}{R\omega} \quad \text{(Eq. 18)}$$

A meter 10 of the present invention, constructed in accordance with the structures shown in FIG. 1 and as described above, was tested with different gases under different pressures. To conduct the test, gas bottles were weighed on a scale capable of ±0.0002 pounds accuracy both before and after gas was passed from the bottles through the meter 10. The total mass of the gas passed through the meter 10 was determined using the reading from the meter 10 for each test and that total was compared to the difference in the weight of the gas bottle to determine percent error. The range of measured percent errors was +0.6 to −0.4 percent gas mass flow rates ranging from 0.2 lb/hr to 9.0 lb/hr. The test parameters and results are set out below:

| Gas | Pressure | Flow Rate (lb/hr) | Percent Error |
|---|---|---|---|
| Nitrogen Specific Gravity .07274 (lb. per cubic foot) | Atmospheric | 9 | −.4% |
| | | 8 | −.2% |
| | | 7 | −.2% |
| | | 6 | 0% |
| | | 5 | +.2% |
| | | 4 | 0% |
| | | 3 | +.2% |
| | | 2 | +.1% |
| | | 1 | −.2% |
| | | .5 | −.4% |

-continued

| Gas | Pressure | Flow Rate (lb/hr) | Percent Error |
|---|---|---|---|
| Argon Specific Gravity 1037 (lb. per cubic foot) | Atmospheric | 9 | −.2% |
| | | 8 | 0% |
| | | 7 | +.2% |
| | | 6 | +.2% |
| | | 5 | +.2% |
| | | 4 | +.2% |
| | | 3 | +.2% |
| | | 2 | +.2% |
| | | 1 | +.2% |
| | | .5 | −.4% |
| Helium Specific Gravity .01039 (lb. per cubic foot) | Atmospheric | 1 | +.6% |
| | | .5 | +.2% |
| | | .2 | +.2% |
| Nitrogen Specific Gravity 1.6 (lb. per cubic foot) | 270 (lb. per square inch) | 4 | +.25% |

Figure 11:
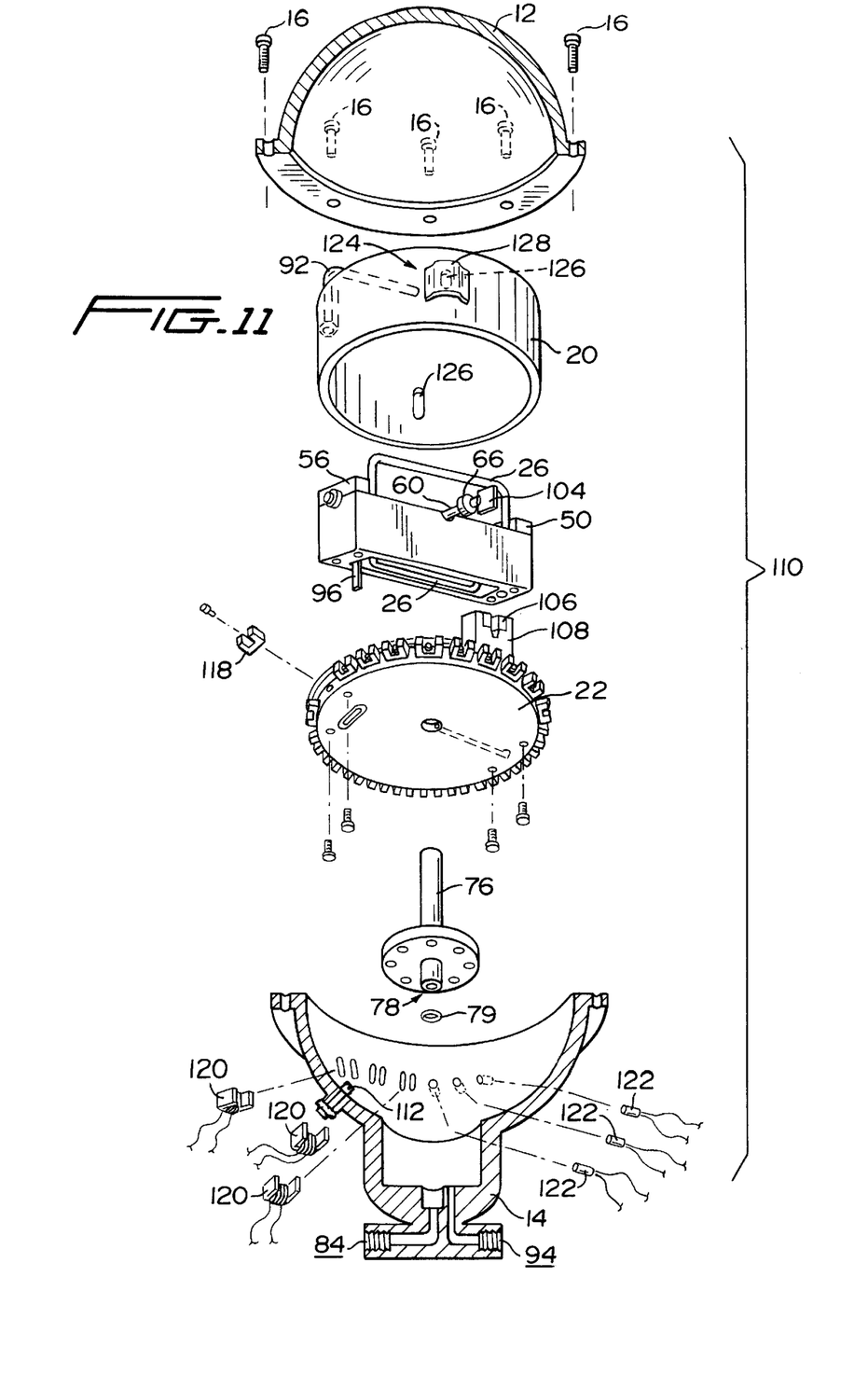
FIG. 11 is an exploded view of a meter embodiment of this invention usable with corrosive or flammable gases shown in partial sectional view.
Figure 12:
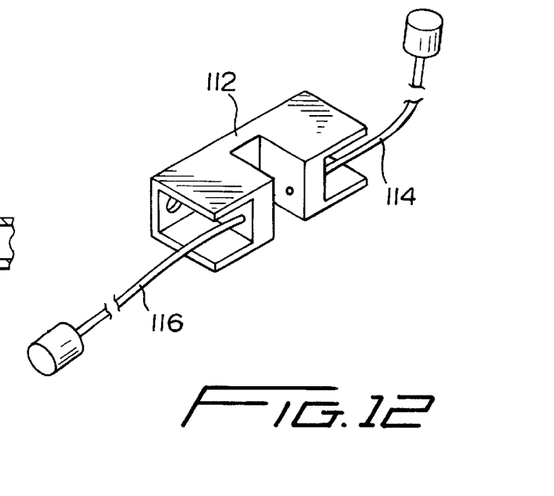
FIG. 12 is a perspective view of an optical slot detector usable for the meter embodiment shown in FIG. 11.

An exploded view showing the major components and their relationships for a meter according to the invention that is usable with corrosive or flammable gases is set out in FIG. 11. The meter according to the invention shown in FIG. 11 is generally designated by reference numeral 110. Essentially all of the components and their functions for meter 110 are the same as those shown and described for FIG. 1, except for substitution of non-electrical components for all of the electrical components in meter 10 as contained in a pressure vessel. Therefore, a DC brushless motor having all of its electrical components exterior to the pressure vessel is substituted for the previously described motor 70. Also an optical slot detector 112 with fiber optic cables 114 and 116 (see FIG. 12) is substituted for the previously used optical slot detector 100 with its LED and optical detector mounted inside the pressure vessel.

The substituted DC brushless motor for meter 110 utilizes permanent magnets 118 bolted or otherwise fastened on the outside perimeter of base plate 22. As with the rotor magnets 75 of motor 70, the permanent magnets 118 are mounted so as to have their magnetic fields interact with magnetic fields generated by electromagnets. In the case of the present embodiment, the electromagnets cannot be mounted inside the pressure vessel. Instead, these are individual electromagnets 120 mounted on the exterior of the lower pressure vessel half 14 so that their generated magnetic fields interact with the magnetic fields of the permanent magnets 118 mounted on the base plate 22. Furthermore, Hall effect devices 122 are also mounted on the exterior of the lower pressure vessel half 14 to implement use of a phase lock loop control arrangement to energize this DC brushless motor. This phase lock loop control arrangement is identical to that used to energize DC brushless motor 70.

Gas is fed into the meter 110 using a hollow shaft 76 which is also used to support base plate 22 for rotation. Again rotary seal 78 is used to support the hollow shaft 76 so that rotation of the shaft 76 is substantially friction-free and there is low gas leakage.

The optical slot detector 112 used for meter 110 to measure angular positions of pick-off flag 96 does not include a LED or optical detector mounted in the pressure vessel as does the optical slot detector 100 described for meter 10. Instead the optical slot detector 112 (see FIG. 12) utilizes fiber optic cables 114 and 116 to bring only optical radiation into and out of the pressure vessel and not electrical energy. The LED and optical detector are mounted outside the pressure vessel.

Also shown in FIG. 11 are covered apertures in rotating cylinder 20. These covered apertures 124, consisting of apertures 126 and covers 128, are not uniquely required for meter embodiments used to measure mass flow rates of flammable or corrosive gases but are also usable with meters such as those shown in FIG. 1. The purpose of the covered apertures 124 is to vent gas pressure surges from rotating cylinder 20 that could pass through flow tube assembly 24, but which could damage rotating cylinder 20. The covered apertures 124 are positioned about rotating cylinder 20 to preserve the dynamic rotational balance of the structure.

The above discussion and related illustrations of the present invention are directed primarily to a preferred embodiment and practices of the invention. However, it is believed that numerous changes and modifications in the actual implementation of the concepts described herein will be apparent to those skilled in the art, and it is contemplated that such changes and modifications may be made without departing from the scope of the invention as defined by the following claims.

What is claimed is:

1. A meter for measuring mass flow rates of a gas passed through a flow tube, said meter comprising:
    (a) a flow tube assembly mounted for rotation about both a first axis and also rotation about a second axis, said flow tube assembly including (i) at least one flow tube so that rotation of said flow tube assembly about the first axis in combination with gas flowing through said flow tube results in a Coriolis/gyroscopic force being generated that acts to rotate said flow tube assembly about the second axis, and (ii) counterbalancing mass means that upon rotation of said flow tube assembly about the first axis produce a radial acceleration force that opposes the Coriolis/gyroscopic force acting on said flow tube assembly about the second axis; and,
    (b) rotary seal means for mounting said flow tube assembly for rotation about said second axis, said rotary seal means include a bearing means interconnecting a first rotatable structure means and a second rotatable structure means for rotation with respect to each other;
    wherein the magnitude of rotation of said flow tube assembly about the second axis is a measure of the mass flow rate of the gas passing through said flow tube.

2. A meter according to claim 1 wherein said flow tube assembly includes a central beam means to which said flow tube and said counterbalance mass means are attached, said central beam means having a longitudinal axis that is perpendicular to the first axis and coincidental with the second axis.

3. A meter according to claim 2 wherein there are two counterbalance mass means, and each of said counterbalance means is attached at one end to said central beam means.

4. A meter according to claim 3 wherein a weight means is attached on each of said counterbalance beam means and the combination of the positions of the attachments of said weight means on said counterbalance beam means and the angular velocity of rotation of said flow tube assembly about the first axis determines the magnitudes of the radial acceleration forces.

5. A meter according to claim 1 wherein damper means are attached to said flow tube assembly to reduce the affects of pulsating flow induced oscillations on the rotation of said flow tube assembly about the second axis.

6. A meter according to claim 5 wherein said damper means includes at least one electrically conductive plate means positioned to move through a magnetic field so that the movement of said electrically conductive plate means through the magnetic field reduces the angular speed of rotation of said flow tube assembly about the second axis.

7. A meter according to claim 2 wherein a flow tube counterbalance beam means is attached to said central beam means so that the center of gravity for the combination of said flow tube and said flow tube counterbalance beam means is located at the center of said central beam means.

8. A meter according to claim 2 wherein a second flow tube is attached to said central beam means so that the center of gravity for the combination of the attached two flow tubes is located at the center of said central beam means.

9. A meter according to claim 2 wherein more than two flow tubes are attached to said central beam means.

10. A meter according to claim 1 wherein said flow tube is a continuous tube, and said flow tube is configured so that sections of said flow tube extend away from the second axis to be said counterbalancing mass means.

11. A meter according to claim 1 wherein a pick-off flag means is attached to said flow tube assembly for rotation with said flow tube assembly about the second axis, and said pick-off flag means moves with respect to a position detector means that outputs signals that are measurements of the angular positions of said flow tube assembly with respect to the second axis.

12. A meter according to claim 11 wherein said position detector means includes a light detector means and a light source means that are maintained in positions such that said pick-off flag means will block the light from said light source means from reaching said light detector means as said pick-off flag means passes between said light source means and said light detector means.

13. A meter according to claim 1 further comprising a rotating cylinder means that encloses said flow tube assembly during rotation about the second axis in response to both the generated Coriolis/gyroscopic and opposing radial acceleration forces, said rotating cylinder means shields said flow tube assembly from external force sources other than the generated Coriolis/gyroscopic and opposing radial acceleration forces.

14. A meter according to claim 1 further comprising a pressure vessel for enclosing said flow tube assembly during rotations about both the first and second axis.

15. A meter according to claim 1 wherein said rotary seal means include a first surface on said first rotatable structure means and a second surface on said second rotatable structure means, and said first and second surfaces are maintained in close non-contacting positions throughout rotation of said first and second rotatable structure means to restrict the flow of gas between said first and second surfaces.

16. A meter according to claim 15 wherein said first surface and said second surface of said rotary seal means extend coaxially about the second axis.

17. A meter according to claim 15 wherein said first surface and said second surface of said rotary seal means extend radially in perpendicular directions from the second axis.

18. A meter according to claim 1 wherein said flow tube assembly is rotated about the first axis at a constant angular speed.

19. A method for measuring the mass flow rate of a gas, including the steps of:

rotating a flow tube assembly about a first axis, said flow tube assembly including (i) a flow tube through which the gas whose mass flow rate is to be measured can be passed so that the combination of the gas flowing through said flow tube and the rotation of said flow tube assembly about the first axis produce a Coriolis/gyroscopic force that acts to rotate said flow tube assembly about a second axis, and (ii) counterbalance mass means that on rotation of said flow tube assembly about the first axis produce a radial acceleration force that opposes the Coriolis/gyroscopic force acting about the second axis;

determining a perennial angular position of said flow tube assembly about the second axis when no gas is flowing through said flow tube and said flow tube assembly is rotating about the first axis;

flowing gas through said flow tube;

determining the angular difference between the perennial angular position of said flow tube assembly when no gas is flowing through said flow tube and the angular position of said flow tube assembly as rotated about the second axis from the perennial angular position by the resultant of the Coriolis/gyroscopic and opposing radial acceleration forces; and converting the magnitude of the determined angular difference to a measurement of the mass flow rate of the gas flowing through said flow tube.

20. The method of claim 19 further including the step of flowing the gas whose mass flow rate is to be measure through one rotary seal means for passage into said flow tube, and flowing that gas which has passed through and out of said flow tube through a second rotary seal means.

21. The method of claim 19 further including the step of rotating said flow tube assembly at a constant angular speed about the first axis.

22. A meter for measuring the mass flow rate of a gas, said meter comprising:

a flow tube assembly having a central beam from which a flow tube is attached so that when said flow tube assembly is rotated about a first axis and gas is passed through said flow tube a Coriolis/gyroscopic force is produced that acts to rotate said flow tube assembly about a second axis, further attached to said flow tube assembly is at least one counterbalance mass that on rotation of said flow tube assembly about the first axis generates a radial acceleration force that opposes the Coriolis/gyroscopic force acting on said flow tube assembly about the second axis; and at least one rotary seal means for mounting said flow tube assembly for rotation about the second axis, said rotary seal means including a bearing interconnecting a stator to a rotor;

wherein the magnitude of rotation of said flow tube assembly about the second axis is a measure of the mass flow rate of the gas passing through said flow tube.

23. A meter according to claim 22 wherein said stator has a stator surface formed at one end of said central beam and said stator surface is maintained in a close non-contacting relationship, throughout the rotation of said rotary seal means, with a rotor surface on said rotor so as to restrict gas flow between said stator and said rotor surfaces.

* * * * *